United States Patent [19]

Gottwald

[11] Patent Number: 4,958,247
[45] Date of Patent: Sep. 18, 1990

[54] MAGNETIC TAPE RECORDER HAVING TAPE BUFFER VACUUM CHAMBERS AND ANTE CHAMBERS

[75] Inventor: Winfried Gottwald, Krailling, Fed. Rep. of Germany

[73] Assignee: Siemens Aktiengesellschaft, Berlin and Munich, Fed. Rep. of Germany

[21] Appl. No.: 910,822

[22] Filed: Sep. 23, 1986

Related U.S. Application Data

[63] Continuation of Ser. No. 573,027, Jan. 23, 1984, abandoned.

[30] Foreign Application Priority Data

Jan. 25, 1983 [DE] Fed. Rep. of Germany ....... 3302334

[51] Int. Cl.⁵ ...................... G11B 15/58; G11B 5/008
[52] U.S. Cl. ........................................ 360/90; 242/192
[58] Field of Search ............................ 360/90, 93, 95; 242/182, 185, 186, 197-200

[56] References Cited

U.S. PATENT DOCUMENTS

| | | | |
|---|---|---|---|
| 3,359,547 | 12/1967 | Lehnert | 360/90 |
| 3,430,833 | 3/1969 | Fabris | 226/195 |
| 3,645,471 | 2/1972 | Kjos | 242/182 |
| 3,823,895 | 7/1974 | Jones | 242/186 |
| 3,967,319 | 6/1976 | McCollum | 360/90 |
| 3,974,981 | 8/1976 | Stiegler | 242/182 |
| 4,315,287 | 2/1982 | Noguchi | 360/95 |
| 4,331,306 | 5/1982 | Epina et al. | 242/182 |
| 4,456,200 | 6/1984 | Ariniello | 360/90 |

FOREIGN PATENT DOCUMENTS

| | | |
|---|---|---|
| 1088263 | 9/1960 | Fed. Rep. of Germany . |
| 2822296 | 11/1979 | Fed. Rep. of Germany . |
| 2027251 | 2/1980 | United Kingdom ................. 360/90 |

OTHER PUBLICATIONS

Aweida, J. I.; IBM Technical Disclosure Bulletin, vol. 8, No. 12; 5/1966, pp. 1715-1716; Title: Tape Path for Advanced Tape Drive.

Frauenfelder et al., IBM Technical Disclosure Bulletin, vol. 15, No. 8, Jan. 1973, pp. 2503-2504.

Primary Examiner—David J. Severin
Attorney, Agent, or Firm—Hill, Van Santen, Steadman & Simpson

[57] ABSTRACT

A magnetic tape recorder contains two tape buffer vacuum chambers disposed at opposed sides of a supply reel and a take-up reel situated therebelow. The open ends of the buffer chambers are both directed down and vacuum antechambers are disposed therebetween. Proceeding from the supply reel, magnetic tape is conducted through the buffer chamber and ante-chamber associated with the supply reel, over a magnetic head, over a drive capstan and through the antechamber and buffer chamber associated with the take-up reel to be taken up by the take-up reel. The magnetic tape recorder enables automatic threading of the magnetic tape and affords a compact structure adaptable even for very high tape speed operations.

6 Claims, 1 Drawing Sheet

U.S. Patent
Sep. 18, 1990
4,958,247
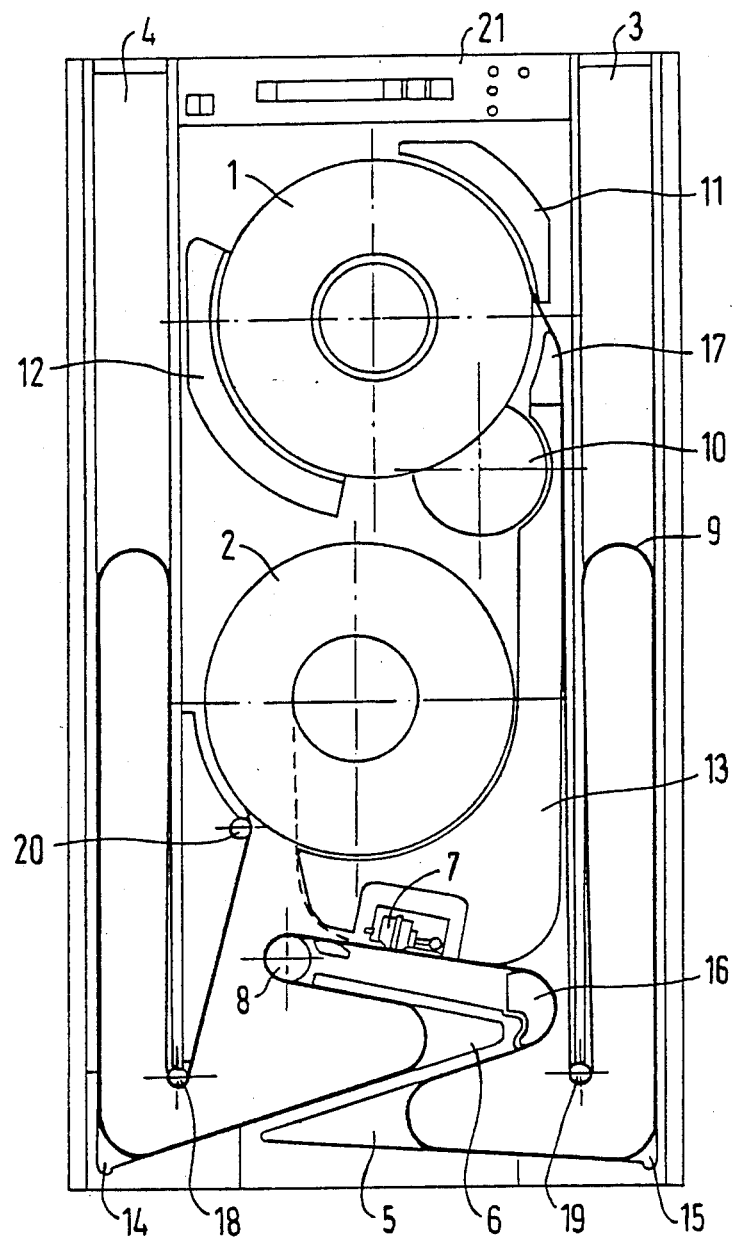

MAGNETIC TAPE RECORDER HAVING TAPE BUFFER VACUUM CHAMBERS AND ANTE CHAMBERS

This is a continuation of application Ser. No. 573,027, filed Jan. 23, 1984, now abandoned.

BACKGROUND OF THE INVENTION

The invention relates to a magnetic tape recorder and, more particularly, to a magnetic tape recorder construction having vacuum chamber-type tape buffer means in the tape transport system arranged to provide a more compact and simplified assembly.

Magnetic tape recorders are generally known wherein a magnetic tape is conducted from a supply or file reel across a tape buffer vacuum chamber associated with the supply reel then past a magnetic head assembly and across a further tape buffer vacuum chamber associated with a take-up reel to be taken up by the take-up reel. The magnetic tape is driven by at least one capstan that is disposed between the buffer chambers and directed on its path by tape guide rollers, usually in the form of air bearings. Typically, digital data is recorded on or played back from the magnetic tape at the magnetic head.

One such known magnetic tape recorder construction is disclosed in German Patent 28 22 296. There, the take-up reel is disposed below the supply reel and the buffer chambers are situated at both sides of the supply reel and the take-up reel. The opening of the first buffer chamber associated with the supply reel points up and is disposed in the proximity of the supply reel, whereas the opening of the second buffer chamber associated with the take-up reel points down and is disposed in the proximity of the take-up reel. The capstan is situated directly at the opening of the buffer chamber associated with the take-up reel and the magnetic head is laterally offset between the supply reel and the take-up reel, that is adjacent the take-up reel buffer chamber. The magnetic tape is conducted about guide rollers from the supply reel to the first buffer chamber. The magnetic tape is then conducted back over the. supply reel and past the magnetic head in the proximity of the other buffer chamber, around the capstan, into the other buffer chamber, and from there out and onto the take-up reel. The magnetic tape is deflected at very many locations by means of guide rollers or pneumatic deflectors. This magnetic tape recorder is intended to be compact, but does not contain any vacuum antechambers which are usually disposed in the proximity of the magnetic head and the tape capstan in order to additionally buffer the magnetic tape when recording or playing back the data at high tape speeds.

When this known magnetic tape recorder is to be used for relatively high tape speeds, the height of the buffer chambers is no longer adequate. The magnetic tape recorder must be both upwardly as well as downwardly extended since the open ends of the buffer chambers are disposed at the top and at the bottom, respectively. In this case, the magnetic tape recorder then exhibits a relatively large overall height. If the buffer chambers were only to be extended in one direction, for example toward the top, then modification of the basic structure would be necessary that would be disadvantageous in view of the resulting increased length of magnetic tape to be accelerated by the capstan.

The invention concerns a unique construction for a magnetic tape recorder that affords a compact and simplified structure and that is nonetheless adaptable for a plurality of tape speeds without requiring changes to the basic structure that would undesirably affect performance.

SUMMARY OF THE INVENTION

A magnetic tape recorder, wherein a magnetic tape is conducted to a take-up reel from an overlying supply reel through a side-mounted pair of upright supply and take-up vacuum buffer chambers with a magnetic head assembly and at least one capstan therebetween, is constructed such that both buffer chambers are open toward the bottom take-up reel end of the recorder. The magnetic head assembly and capstan are also disposed below the take-up reel. A pair of supply and take-up vacuum antechambers are respectively disposed at the openings of the buffer chambers and beneath the magnetic head assembly and capstan.

The inventive arrangement of the magnetic tape recorder has the advantage that it can be very compactly built despite the employment of antechambers. It can be accomodated on a standardized assembly plate having a width of 48.26 cm. The magnetic tape recorder also has the advantage that it affords a simplified, accessible structure with a relatively smaller number of tape deflections. The connections for producing the vacuums in the buffer chambers are both situated at the top of the recorder so that the hook up of corresponding hoses or tubes can be simply designed and mounted.

An advantageous disposition of the antechambers is achieved since their openings are directed toward the respective buffer chambers. The antechambers are expediently disposed such they are vertically overlapping one another with openings facing opposite one another. The capstan is preferably disposed at one end of one leg of an antechamber. In an advantageous embodiment, the magnetic head is accomodated between the capstan disposed at one leg of the one antechamber and a guide post disposed at a leg of the other antechamber. The guide post is expediently designed as an air bearing guide post.

The magnetic tape recorder enables an automatic threading of the magnetic tape as a result of its structure.

The upper ends of the buffer chambers may be angled so that the buffer chambers can be lengthened without changing the overall height of the magnetic tape recorder.

BRIEF DESCRIPTION OF THE DRAWING

The FIG. is a schematic plan view of the inventive tape recorder construction.

DESCRIPTION OF THE PREFERRED EMBODIMENT

The FIG. shows the magnetic tape transport system for a tape recorder constructed in accordance with the invention. The magnetic tape recorder is designed for automatic threading of magnetic tape.

The magnetic tape recorder comprises a supply or file reel 1 and a tape take-up reel 2 disposed adjacent one another in the central area of the recorder with the supply reel 1 in the upper portion and the take-up reel 2 in the lower portion. A first or supply vacuum buffer chamber 3 is disposed along the right side of the recorder and a second or take-up vacuum buffer chamber 4 is disposed along the left side of the recorder. Both buffer chambers have open lower ends. Between the open ends of the buffer chambers and beneath the take-up reel 2 is a pair of supply and take-up vacuum antechambers 5 and 6, respectively, disposed in vertical overlapping relation with one another and each having an open side through which tape enters and exits correspondingly facing the associated buffer chamber. Between the antechambers and the take-up reel 2 a magnetic head assembly 7 and a tape drive capstan 8 are arranged.

The supply reel 1 is removable and provided with a file roll of magnetic tape 9. The magnetic tape is automatically fed to the take-up reel 2 and, upon employment of vacuum, is sucked into the buffer chambers 3 and 4 as well as into the antechambers 5 and 6. This operation is referred to as automatic threading or automatic loading. The supply reel 1 may have a cassette ring, which is opened by use of a disc 10 equipped with a dog pin and is pressed against a loading ring receptacle 11 and pressure faces 12. A drive motor connected to the supply reel 1 unwinds the magnetic tape. With the use of compressed air, the magnetic tape is conducted past a lobe-shaped guide 13 and past the magnetic head 7 to the take-up reel 2, as indicated by the broken lines in the area of the take-up reel 2. The take-up reel 2 is connected to a source of vacuum and is simultaneously turned so that it can catch the end of the magnetic tape 9.

After a predetermined part of the magnetic tape 9 has been unwound from the supply reel 1, the rotational sense of the take-up reel is reversed so that the magnetic tape is partially unwound again. Application of vacuum is switched from the take-up reel 2 to the antechambers 5 and 6 as well as the buffer chambers 3 and 4 so that the magnetic tape 9 is sucked into these chambers and assumes the positions illustrated in the FIG. in which loops are formed both in the buffer chambers 3 and 4 and in the antechambers 5 and 6. The capstan 8 is wrapped by the magnetic tape 9 and the magnetic tape 9 can be transported in both directions given driven rotation of the capstan 8.

Deflection of the magnetic tape 9 occurs at lower corners 14 and 15 at the lower open ends of the buffer chambers 4 and 3, respectively, as a result of vacuum application there. Guide deflections of the tape occur adjacent the opening of the antechamber 5 and at the pay-out of the supply reel 1 as a result of pneumatic deflector or air bearing posts 16 and 17, respectively. Mechanical guide posts 18, 19 and 20 designed as rollers are provided at the openings of the buffer chambers 3 and 4 and in the proximity of the take-up reel 2.

For data block recording or playback of data onto or from the magnetic tape 9, it is typically necessary to accelerate or decelerate the magnetic tape 9 to its nominal speed in the relatively short gaps between the neighboring data blocks. A low-inertia tape drive with high acceleration performance is generally required for that purpose. Since, however, the supply reel 1 and/or the take-up reel 2 with their associated drive motors exhibit extremely high inertia, it is necessary to dispose the respective buffer chambers 3 and 4 between the tape drive capstan and each tape reel in such manner that a decoupling of the tape drive from the drives of the tape reels is achieved by means of buffering the magnetic tape. The antechambers 5 and 6 also serve to reduce the tape mass to be accelerated by the tape drive in order to thus improve the start-stop behavior of the tape drive.

The open ends of the buffer chambers 3 and 4 are both downwardly directed and the antechambers 5 and 6, which are laterally V-shaped, are open toward the respective buffer chambers 3 and 4. A simple tape transport guidance system is thus provided. The length of the vacuum columns of buffer chambers 3 and 4 can be varied without requiring change of the remaining basic tape transport structure. The magnetic tape recorder can, for example, be adapted to different tape speeds in a very simple manner by so doing. A simple lengthening of the vacuum columns of buffer chambers 3 and 4 can also be achieved while maintaining the same overall chamber height if their ends are angled toward the supply reel 1.

The inventive disposition of the buffer chambers 3 and 4 has the structural advantage that the connections for producing the column vacuum are both provided at the upper end of the magnetic tape recorder. A further capstan can, of course, be provided instead of the guide post 16 so that a separate capstan 8 is provided for each running direction of the magnetic tape 9.

The magnetic tape recorder need not necessarily be designed for automatic threading. The magnetic tape 9 could be manually pulled from the supply reel 1 over the magnetic head 7 to the take-up reel 2 and wound there by means of a few revolutions. Subsequently, a part of the magnetic tape 9 is then unwound from the supply reel 1 and/or the take-up reel 2 and the magnetic tape is brought into the illustrated position due to the application of vacuum pressures in the buffer chambers 3 and 4 as well as in the antechambers 5 and 6. Just as in the case of automatic threading, the magnetic tape 9 is subsequently wound onto the take-up reel until a tape start mark is recognized. Recording or playback of data can subsequently begin upon employment of the magnetic head 7.

In case the antechambers 5 and 6 are not required, these can be replaced by corresponding guide posts without the basic structure of the magnetic tape recorder being changed.

Although various minor modification ma be suggested by those versed in the art, it should be understood that I wish to embody within the scope of the patent warranted hereon all such modifications as reasonably and properly come within the scope of my contribution to the art.

I claim as my invention:

1. A compact magnetic tape recorder affording high speed operation and comprising an upper tape supply reel and a lower tape take-up reel both disposed for rotation and mounted on a longitudinally extended base member, the supply reel disposed longitudinally above the take-up reel, pair of first and second vacuum column buffer chambers disposed at respective opposed lateral sides of said base member and both having downwardly facing open ends, said supply and take-up reels disposed between said buffer chambers, a magnetic head assembly disposed on said base member in between said buffer chambers and longitudinally underlying said take-up reel, a single drive capstan disposed adjacent said magnetic head assembly on said base member, a pair of first and second longitudinally overlapped vacuum antechambers disposed on said base member beneath said magnetic head assembly in between said buffer chambers and partly above said downwardly facing open ends of said buffer chambers, said first and second antechambers having respective openings.

2. The magnetic tape recorder of claim 1, wherein said buffer chambers are longitudinally directed.

3. The magnetic tape recorder of claim 1, wherein said antechambers are in lateral V-shapes.

4. The magnetic tape recorder of claim 1, wherein said drive capstan is disposed at a lateral end of an upper wall of one of said antechambers.

5. The magnetic tape recorder of claim 4, wherein guide post means is disposed at a lateral end of an upper wall of the other said antechamber.

6. The magnetic tape recorder of claim 5, wherein said guide post means is an air bearing.

* * * * *